INTERRUPT HANDLING

Filed April 22, 1971 5 Sheets-Sheet 1

FIG. 4
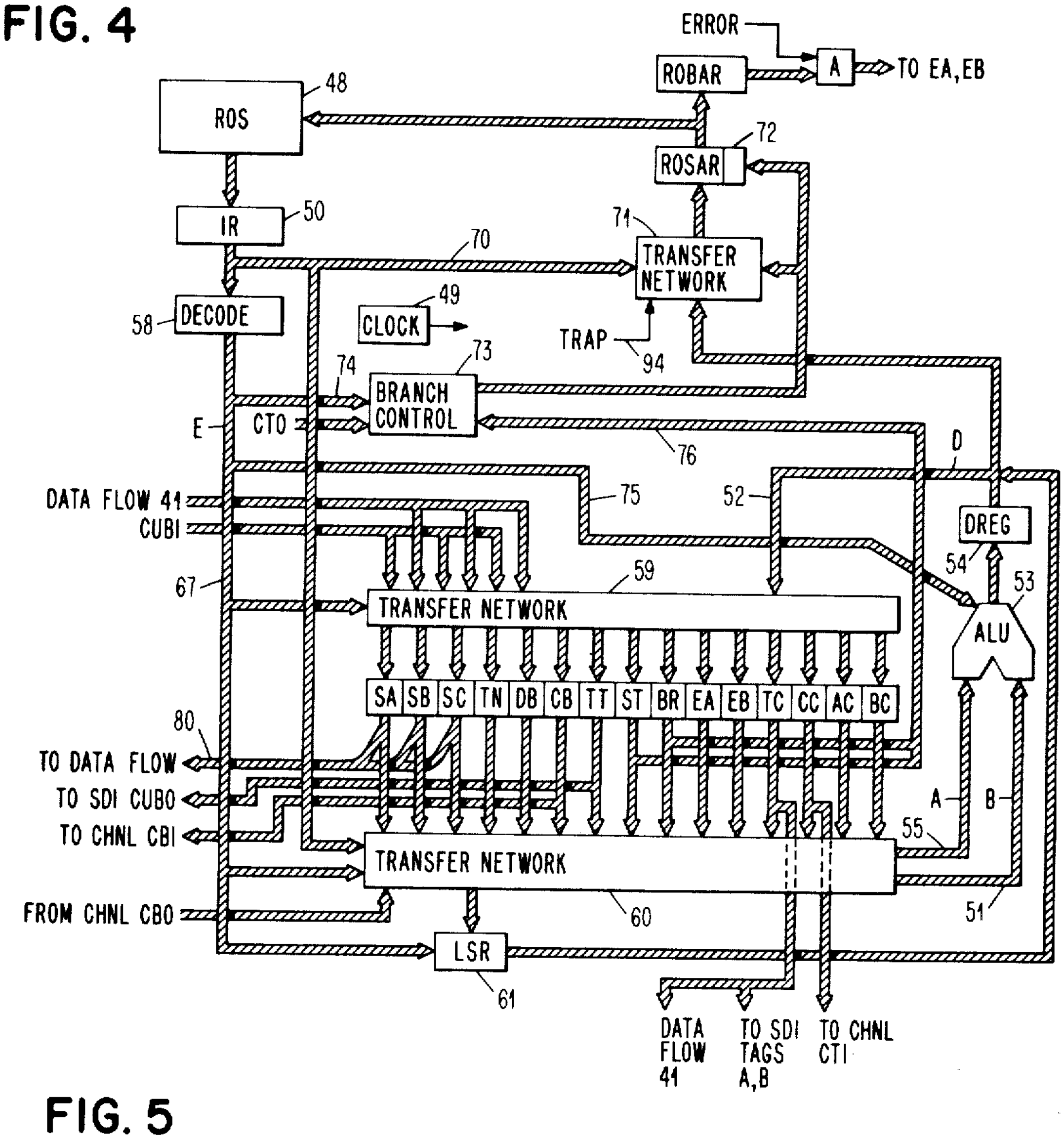
FIG. 5
| | | | | | | | |
|---|---|---|---|---|---|---|---|
| FORMAT 0 | CK | | CB/CD | OP | CX | CH | CL |
| FORMAT 1 | CA | CB | CD | OP | CX | CH | CL |
FIG. 6
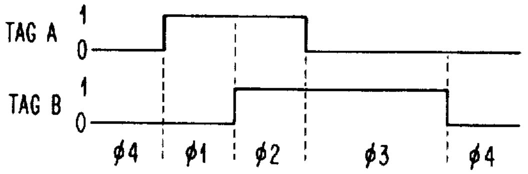

United States Patent Office 3,716,837
Patented Feb. 13, 1973

3,716,837

INTERRUPT HANDLING

James M. Waddell, Boulder, Colo., assignor to International Business Machines Corporation, Armonk, N.Y.

Filed Apr. 22, 1971, Ser. No. 136,429
Int. Cl. G06f *15/16, 9/18*
U.S. Cl. 340—172.5 15 Claims

ABSTRACT OF THE DISCLOSURE

A multi-unit data processing system provides communication between the various units by sets of data lines with associated control (tag) lines. The control lines carry signals for initiating, controlling, monitoring, and terminating transmissions over the data lines which may contain bytes of data or sets of command signals. All of the communication links are asynchronous, one with the other. Interconnection of the units enables a plurality of units in a first set to service and communicate with any one unit in a second set of units. The second set of units provides selective communication paths between units in a first and third set. The third set units may selectively provide interrupt signals to any one of the second set units. The disclosure teaches timing and lockout provisions for multiple interrupt and multiple unit handling of a single interrupt.

REFERENCES TO PATENTS

U.S. Pats. 3,372,378, 3,303,476, 3,400,371, and 3,550,133 are incorporated by reference into the following description.

BACKGROUND OF THE INVENTION

The present invention relates to data processing systems, particularly to a multi-unit data processing system and units therein for handling interruption signals on an asynchronous basis through a plurality of independent paths.

The complexity of data processing systems is continually increasing. The usage of plural central processing units (CPU's) such as the one shown in U.S. Pat. 3,400,371 and a complex multi-unit peripheral subsystem is gaining favor because of flexibility and increased efficiencies in the data processing operations being performed. For example, two or more CPU's may be interconnected with two to four I/O controllers which in turn are connected to one of 16 I/O devices through a subsystem device interface (SDI) switch. The arrangement is such that any one of the CPU's can select any one of the I/O controllers and then in turn select any one of the 16 devices. The next time around, the same CPU can use another I/O controller to access or address the same or another I/O device. In many instances, the I/O controllers can communicate with more than one CPU through a multiple interface switch (MIS), also referred to as a two-channel switch. Most CPU's have a plurality of I/O channels which are accessible by programs within the CPU. Accordingly, one CPU can be connected to a plurality of I/O controllers over independent channels. Additionally, each I/O channel usually has the capability of tying together more than one peripheral subsystem to the CPU. The peripheral subsystems then time share such I/O channels.

Many CPU's have separate sequencing units called "channels" which control I/O operations. The term "CPU" is used generically to cover such types of arrangements, i.e., the "channel" portion of a CPU actually effects the described controls and responses. The term "channel," when used, refers to such portions of a CPU.

To simplify synchronization and programming of such a complex data processing system, each of the units are preferably designed to have a large portion of free-standing or independent operations. The CPU, for example, initiates an operation in an I/O controller. Once the command is received by the I/O controller, it may disconnect from the CPU to perform the commanded operation. Upon completion of the operation, the CPU is notified through suitable control signals. The CPU senses the control signals and then proceeds to the next command to be performed by the I/O controller. The I/O controller may operate with the various I/O devices in a similar manner.

In such systems, the various CPU's may be considered as the controlling data processing system. The I/O controller are responsive to and are monitored by such CPU's. In turn, the I/O devices are subservient to the various I/O controllers and indirectly to the CPU's (based upon the commands supplied by the programs in the CPU's to the various I/O controllers). Situations arise because of some events that occurred in the subservient system wherein the subservient system using the I/O device or the I/O controller should gain access to the CPU program for supplying status or operational information thereto. For example, if an I/O device has finished a rewind of a magnetic tape, the I/O device should tell the CPU that it is ready for data recording operations, for example. The device initiates notification by supplying an interrupt signal to the I/O controller. The I/O controller responds to the interrupt signal to supply a request in (REQIN) to the appropriate CPU's or all CPU's. The CPU's scan the channels for such REQIN. This scanning is done in an asynchronous repeatable manner. One or more of the CPU's may respond to the REQIN which may be supplied by one or more of the I/O controllers. Such response initiates the selection of the I/O device by the I/O controller. Based upon signals associated with the interrupt signal, the CPU will respond and cause the next function to be performed by the I/O device. Coordination of the operation of the I/O device between a plurality of CPU's follows known techniques and is not further discussed for that reason.

A problem arising wherein a plurality of I/O controllers can respond to a single interruption signal supplied by any of the I/O devices with a plurality of CPU's responding to the interrogation of such plurality of I/O controllers creates undesired multiple servicing problems of one interruption signal. Certain interrupt signals supplied by the I/O device should be serviced one and only once; otherwise, errors will be introduced into the data processing system operation. Such multiple servicing is created by timing and logic problems of the multiple unit data processing system organization.

SUMMARY OF THE INVENTION

It is an object of the present invention to provide for efficient, low-cost, rapid handling of interruption signals by one of a plurality of units in a hierarchal data processing system.

The present invention includes a data processing subsystem having a plurality of peripheral devices such as magnetic tape units and the like which are selectively switched to one of a plurality of independently operable controllers. Further, each of the controllers is independently operable with one of a plurality of CPU's. In one sense, CPU's are units in a first set of units; the controllers are units in a second set of units; and the peripheral devices are units in a third set of units. Each device is capable of supplying an interrupt or interruption signal and indicating whether it is busy or not busy. The interruption signal is associated with a set of signals generated in the device for indicating the purpose of the interruption signal.

Each of the controllers independently repeatedly scans a switching system interconnecting the plurality of devices with the controllers for detecting interruption signals from any of the devices. Each of the controllers may independently receive the interrupt signal and memorize it for later use in connecting a CPU for servicing such interrupt signal from the device. CPU's, in turn, scan the I/O controllers via I/O channels for detecting whether or not any of the I/O controllers is supplying a REQIN signal for servicing the memorized interrupt signal. Any of the CPU's can acquire any of the I/O controllers for servicing the interrupt. Upon being acquired, the I/O controller then sends an acquisition signal to the I/O device. If the I/O device is not busy, then a connection is made between the CPU answering the request signal and the I/O device for handling the interrupt. If the I/O device indicates it is busy, and the I/O controller still has memorized the interrupt signal, then the CPU is notified that there is an interrupt signal, but no action need be taken. On the other hand, if one or more of the I/O controllers in scanning for interruption signals, detect that the interruption signal has been serviced by another I/O controller, the memorization of such interruption signal is erased in the I/O controller; and REQIN to the CPU's is deactivated.

The invention further contemplates construction and operation of I/O controllers for operation in a multi-unit system. Such an I/O controller has scanning means, preferably microprogram scanning means. Detected interruption signals are stored in first register means dedicated for memorizing such interruption signals in association with a particular I/O device—that is, there is one register means for each of the I/O devices. Such register means may be capable of storing several binary digits. Further, the I/O controller is capable of recognizing first and second types of interruption signals. The first is suppressible, i.e., need not necessarily be handled on an immediate basis, while the second class is one that is non-suppressible—to be handled on a high-priority basis. The I/O controller further includes second scanning means, preferably microprogram scanning means, which scan the first registers for detecting whether or not there is a memorized interruption signal. Upon detection of a memorized interruption signal, a signal is supplied by the I/O controller for use by a connected CPU requesting servicing of the I/O device which supplied the interruption signal. Preferably, the I/O controller has an additional register for containing the address or indication of which I/O device had supplied the interruption signal. Upon a response by a CPU, the I/O controller selects the device in accordance with the address in the additional register and provides a logic connection between the CPU and the interrupting I/O device.

In a preferred form of the I/O controller, the second scanning means is responsive to detection of a memorized interruption signal associated with a given I/O device to update the additional register for containing the address of the device of the last detected interruption signal. An exception is made when the interruption signal is of the second class wherein the updating of the address is then inhibited until the interruption signal of the second class has been erased by servicing the interrupting I/O device.

The invention further contemplates particular microprogram arrangements and hardware capabilities, and the melding of the two arrangements for providing efficient scanning, branching for enhancing interruption signal handling; timing accommodations between the I/O controller, the I/O device and the CPU's for preventing glitches plus improper handling or duplicate handling of interruption signals; methods of operating a data processing system including CPU's, I/O controllers, and peripheral devices; and methods of operating a subsystem having a plurality of I/O controllers with a plurality of I/O devices.

The foregoing and other objects, features, and advantages of the invention will be apparent from the following more particular description of preferred embodiments of the invention, as illustrated in the accompanying drawings.

THE DRAWINGS

FIG. 4 is a simplified logic digaram of a microprocessor usable in any of the control units shown in FIG. 3.

FIG. 5 is a simplified presentation of an instruction word usable by the FIG. 4 illustrated microprocessor.

FIG. 6 is a timing diagram used to illustrate communication between control unit and device.

DETAILED DESCRIPTION OF A PREFERRED EMBODIMENT

Figure 1:
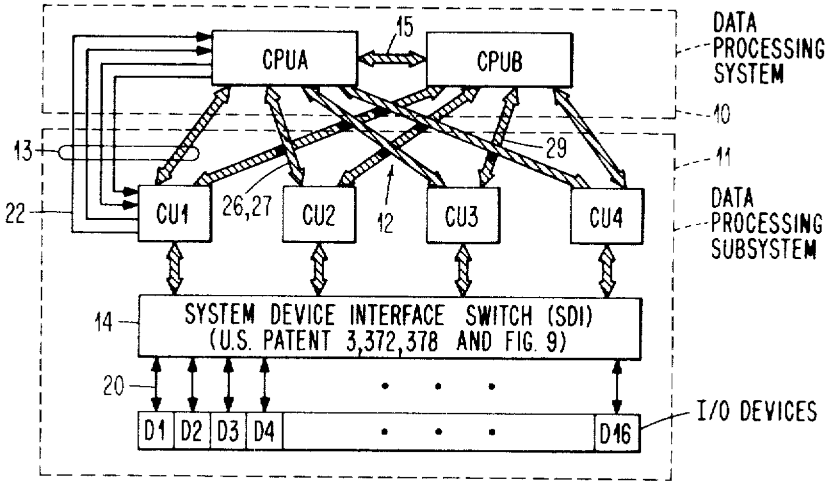
FIG. 1 is a simplified overall logic diagram of a multi-unit data processing system capable of incorporating the present invention.

Referring now more particularly to the drawings, like numerals indicate like parts and structural features in the various diagrams and flow charts. For aid in understanding the operation of the complex system, numerals with alphabetic suffixes denote electrical signals associated with the enumerated item—that is, "10A" indicates an electrical signal associated with item 10, for example. FIG. 1 illustrates a multi-unit data processing system which can use the present invention. System 10 includes a pair of CPU's, CPUA and CPUB. Each CPU communicates with data processing subsystem 11 over a plurality of I/O channels in accordance with the inventive concepts, principles, and design set forth in the Moyer et al. Pat. 3,303,476. Such interconnections are represented by the cables collectively denoted by numeral 12 and as particularly shown in cable 13 extending between control unit CU1 and CPUA. The other control units CU2–CU4 are connected to CPUA and CPUB in an identical manner. Additionally, CPUA and CPUB may intercommunicate over cable 15 independent of the four control units. Not shown in FIG. 1 are interconnections between CPUA, CPUB, and other data processing subsystems. Each of the control units (CU's) are connected through system device interface switch (SDI) 14 to one of a large plurality of I/O devices enumerated D1–D16.

Figure 9:
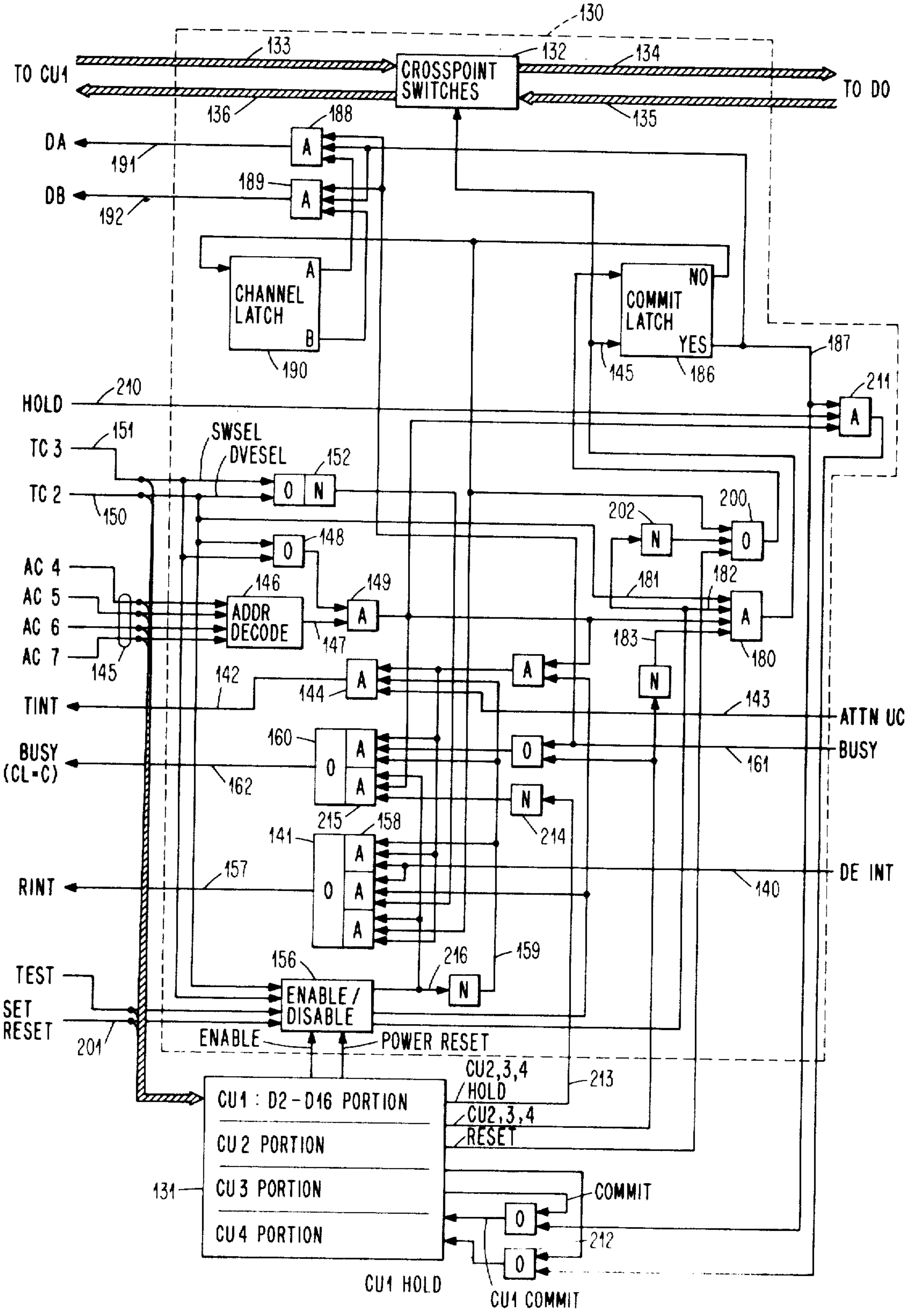
FIG. 9 is an abbreviated logic diagram of a branch control usable with the microprocessor.

System device interface switch can be constructed in accordance with U.S. Pat. Devore et al. 3,372,378. The priority scheme and control linkages described in that patent can be used directly in the FIG. 1 illustrated system. The data lines and command lines, also referred to as tag lines, which provide intercommunication between the various CU's and any of the selected I/O devices, may be different than that shown in the Devore et al. patent. FIG. 9 is an abbreviated showing of an SDI 14 usable with the present invention and having some differences from Devore et al.

The FIG. 1 system operates under the control of CPUA and CPUB. Program coordination between the two CPU's may be through cable 15 or another data processing subsystem such as a common main memory system shared by the two CPU's. The programs resident in the CPU's or the common memory cause selection of one of the four CU's. Commands are then transmitted from the CPU to the selected CU for addressing one of the 16 I/O devices. If the I/O device is not busy, then it can be selected; and a communication link is established by the selected CU between the requesting CPU and the addressed I/O device. The programs in the CPU send further commands to the various CU's for causing the I/O devices to perform selected functions. As described herein, the I/O devices are magnetic media tape units which perform motions on the tape, i.e., rewind, backspace, forward space, file search, read forward, read backward, and the like in response to commands generated by the CPU's and interpreted by the selected CU. The CU then causes a selected sequence of operations to be performed by the I/O device in response to the CPU command. Any cable 12 may be used to transfer any command to a selected CU to effect a function by any of the I/O devices. For example, CPUA may select device CU3 to operate on device D1. If the operation is not chained in accordance with known procedures, the next operation in D1 could be performed by activating CU2.

Each of the I/O devices has a monitoring system of its own, such as detecting when a rewind is completed, a malfunction (set out as a unit check), a spool of tape not being present in the drive, and the like. Upon a certain event such as those described occurring, the I/O device must then communicate such events to the CPU. This is done by supplying an interruption signal through SDI 14 to all of the CU's. The CU's scan for such interruption signals on a repeated basis. When an interruption signal is detected by the scanning CU's, it is memorized therein. The CU, in a subsequent scanning operation, raises a REQIN signal to both CPU's. The CPU's, via their respective channel hardware, are scanning for such REQIN signals. Upon detection of a REQIN signal, CPUA, for example, will command CU2 to honor the interruption signal by device D3. CU2 then selects D3 and passes the interruption information to CPUA for action. Simultaneously therewith, CPUB may command CU3 to service the interruption signal from D3. However, CU3 should not service untagged interruption signals since CU2 already has provided service thereon. As a result, in accordance with this invention, CU3 detects that CU2 has already acquired access to D3 by detection of a busy signal in SDI 14. CU3 responds to the interruption signal and the busy signal from device D3 to provide an interruption signal to CPUB along with status signals indicating no action need be taken.

The program in CPUB interprets the status signals that the interruption signal already has been serviced by another CPU, and no further action need be taken. Further, for example, CU4 having sensed the interruption signal on D3 has memorized same and supplied the REQIN signal to both CPUB and CPUA. However, before CPUA or CPUB can respond to the CU4 REQIN, D3 drops its interruption signal because of the action of CU2. CU4 in its independent scan senses that the interruption signal has been dropped. It then erases the memorization of such interrupt signal. If CU4 has no other interruption signals from other I/O devices, it then drops its REQIN signal. In the present embodiment, each CPU acquires the status signals from CU after acknowledging receipt of the interruption signal in accordance with referenced patent teachings.

To further complicate the matter, there are two types of REQIN supplied by the CU's to the CPU's. One is a suppressible REQIN and the other a nonsuppressible REQIN. Correspondingly, each CU responds to interruption signals supplied by the I/O devices in two different ways—one being suppressible and the other nonsuppressible. This arrangement is a two-level priority for interruption signals indicated by status signals in each CU. The CPU assigns the status by chaining operations, as is well known. The nonsuppressible interruption signal or status indicator has the higher priority. Each CU stores nonsuppressible status for each device in its LSR and in BR branch register, as shown in Table IV in the CU descriptive portion. Absence of such priority indicates suppressible status. The definition of nonsuppressible status can be arbitrary and is usually established to save CPU program execution time, although other bases may be used.

In this regard, each CPU through its I/O channels may issue a tag signal or command called suppress out (SUPPRO). This means the channel is dedicated to a CPU operation. In accordance with the SUPPRO signal, all suppressible REQIN's generated as a result of a suppressible interrupt are ignored by the CPU's and maintained in the CU's until the SUPPRO signal has been removed. Then, the CPU will service the suppressible REQIN's in accordance with the later-described schedule. Nonsuppressible REQIN's bypass the SUPPRO command and inform the CPU that a nonsuppressible situation is occurring in the peripheral subsystem and must be serviced. By appropriate programming within the CPU, the device supplying the nonsuppressible interrupt to the CU which then supplies a nonsuppressible REQIN is the only device on the I/O channel supplying a nonsuppressible control signal.

Figure 2:
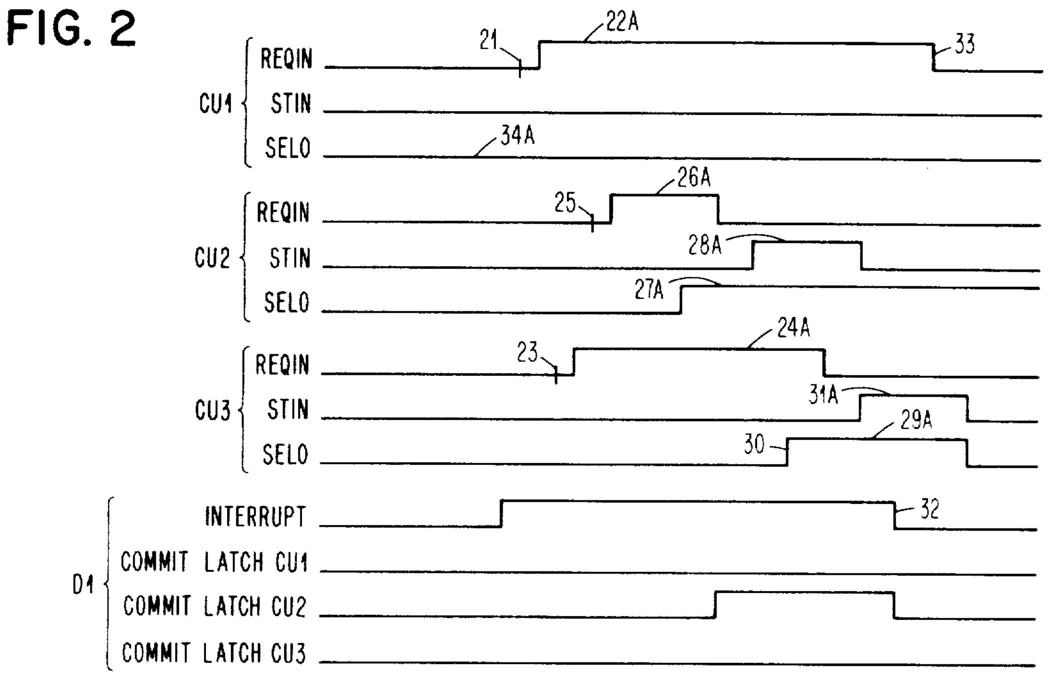
FIG. 2 is a simplified timing diagram illustrating the timing relationships between CPU's, CU's (control units), and the I/O devices with regard to interruption signal handling and resulting selection of the or ignoring control units and I/O devices by the CPU's.

Referring now more particularly to FIG. 2, the simplified timing relationships between CPU and CU's are described with respect to multiple CU's and CPU's trying to service one interruption signal. For purposes of discussion, D1 supplies an interruption signal D1A over cable 20 to SDI 14. One line in the cable is activated by the interruption signal. CU1 scans SDI 14 for the interruption signal and detects same at time 21 shown in signal 22A. The elapsed time between time 21 and activation of REQIN signal 22A on REQIN line 22 is the time required for the CU1 microprocessor to convert the sensed interruption signal to REQIN signal 22A. CU1 is the first CU to supply REQIN in response to D1 interruption signal D1A. For one reason or another, neither CPUA nor CPUB responds to CU1 REQIN signal 22A. The second CU to sense interruption signal D1A is CU3, which senses it at time 23 and raises REQIN signal 24A a short time later. Next, CU2 senses signal D1A at 25 and raises REQIN signal 26A shortly thereafter.

The response signal to REQIN from a CPU is select out (SELO) which indicates to the CU supplying REQIN that an initial selection procedure is to be followed and that the connected CPU will service REQIN. For purposes of illustration, SELO 27A is supplied to CU2 over cable 26, 27 from CPUA. In response to SELO, CU2 branches its microprogram to a device selection microprogram which senses the SDI 14 D1 connection for busy/not busy. CU2 finds D1 not busy and therefore proceeds to complete the connection. Status in (STIN) is raised by CU2 to CPUA at 28 and is supplied over a line within cable 26, 27 to CPUA. At this time, CU2 has acquired the status information from D1 indicating what event has occurred and the present status of D1. CPUA responds to this information for initiating an operation in D1 or for other analysis purposes. Signal 28A becoming active indicates a successful connection has been made. Transfer of command signals from CPU to CU by using channel command words (CCW) is shown in King et al. U.S. Pat. 3,550,133.

Turning now to CU3, it receives a SELO singnal 29A at 30 from from CPUB over cable 29. CU3 responds to this SELO signal to interrogate SDI 14 with respect to D1. Because CU2 had already selected D1, it receives a busy signal from SDI 14 in accordance with the teaching in Pat. 3,372,378, supra. At this time, CU3 by microprogram, establishes a zero status byte and supplies same over cable 29 to CPUB in time coincidence with STIN signal 31A. CPUB responds to zero status to cause CU3 to erase REQIN and then performs no function with respect to D1A interruption signal.

Not that CU2 and CU3 both drop REQIN sometime after receiving SELO. Returning now to CU1, it was never interrogated by either CPU while its REQIN was active, as indicated by signal 22A. However, CU1 continues to scan SDI 14 and senses interruption signal D1A has been dropped at 32. By microprogram, it then erases its REQIN signal at 33, no action having occurred between CU1 and either CPU. Its SELO line was never raised or activated as indicated by signal 34A.

The above describes a sequence of operations showing the three possible conditions with respect to three different CU's in handling a single interruption signal from D1. It is understood that many variations in this sequence are to be expected and that a plurality of interruption signals may be handled simultaneously. In such an instance, a REQIN signal such as CU's REQIN signal 22A is not dropped as soon as an interrupt signal D1A has been serviced. Instead, D4 may send an interruption signal which is still active when D1A drops. Since CU1 would have memorized the D4 interruption signal, REQIN is maintained until all interruption signals in the data processing subsystem 11 have been serviced. The sequence is accurate for both a suppressible and nonsuppressible interruption signal. The prioritizing between suppressible and nonsuppressible is described later with respect to a detailed portion of the CU's.

DESCRIPTION OF CONTROL UNITS

Figure 3:
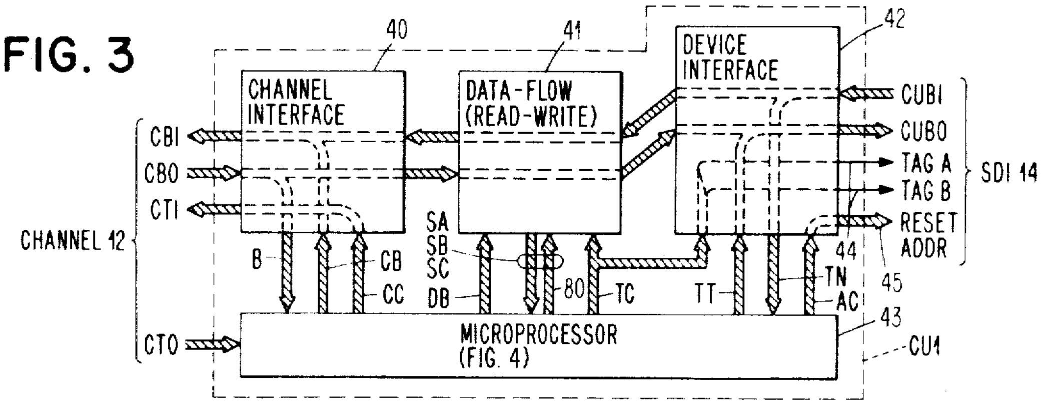
FIG. 3 is a simplified logic flow diagram of a control unit usable in the FIG. 1 illustrated data processing system.

FIG. 3 is a simplified block diagram of CU1. This block diagram is applicable to all CU's in subsystem 11. CU1 consists of channel interface 40 which provides for impedance matching and timing considerations with the I/O channel to either CPUA or CPUB over one of the cables 12. Data flow circuits 41 interconnect channel interface 40 with device interface 42, which in turn is connected to SDI 14. Microprocessor 43, shown in greater detail in FIG. 4, has several electrical connections with portions 40–42 for controlling, monitoring, and responding to conditions therein for effecting data and command signal transfers between CPU's and I/O devices via SDI 14.

Channel interface 40 generally follows the arrangement described in the Moyer et al. Pat. 3,303,476. It includes a channel bus in (CBI) for transferring data and status signals from CU1 to the connected CPU using a two-channel switch which can be either CPUA or CPUB in accordance with the switch setting. These switches are well known and not further described, it being understood that they are a part of CU1 within the channel interface 40. Signals on CBI are supplied either by microprocessor 43 from its CB register or from data flow circuits 41. Data flow circuits 41 detect signals supplied from an I/O device and convert same into digital signals suitable for transferring to a CPU. Register CB in microprocessor 43 contains sense bytes, status information concerning the microprocessor and other portions of CU1 as well as status information concerning a connected I/O device. Interpretation of the signals on CBI by either CPUA or CPUB is in accordance with the signals supplied over the channel tags in (CTI) which are generated by microprocessor 43 and staticized in register CC. The channel tag and channel bus relationships are fully described in the Moyer et al. patent. Communication from the connected CPU to CU1 is by channel bus out (CBO) which is the correlary of CBI and transfers one byte of data at a time. The significance of such signals on CBO is in accordance with the command or tag signals supplied over channel tag out (CTO). CTO signals are received by microprocessor 43. Microprocessor 43 branches on these signals for controlling electrical connections in portions 40–42 of CU1. For example, if device D1 is a magnetic tape unit and signals are to be recorded, then CBO may contain data signals to be recorded in accordance with CTO tag signals. Electrical signals (not shown) are activated in portions 40, 41, and 42 for effecting a signal path from CBO to CUBO, thence to the connected tape device for recording. Microprocessor 43 monitors the data flow and maintains the signal path connection until completion of the recording. On the other hand, CBO may contain command information. In that case, the signals from CBO are routed to microprocessor 43 under its control in response to CTO signals to what is termed the B-bus, as will be later more fully described.

Data flow circuits 41 include conversion circuits, deskewing circuits, and the like usually found in a tape subsystem I/O controller. These are under the control of signals in microprocessor 43 staticized in registers DB, SA, SB, SC, and TC, as will be described with respect to FIG. 4.

Communication between CU1 and any of the connected I/O devices is via SDI 14. SDI 14 merely makes electrical connections for transferring signals in accordance with the teaching in the Devore et al. patent as set forth in the CU device interface. This is constructed similar to the teachings in the Moyer et al. patent and used in the I/O channel interface. Signals supplied from CU1 to devices are over CUBO (control unit bus out). The interpretation of such signals by the connected device is in accordance with tag A and tag B signals supplied over lines 44. These tag signals are staticized in microprocessor 43 in register TC. Additionally, signals supplied over CUBO are staticized in register TT. Microprocessor register AC supplies control signals over cable 45 for resetting the connected device as will become apparent.

Tag A and tag B signal sequences are shown in FIG. 6, and the interpretation of such signal sequences by the devices is now described. During phase 4, when both tags A and B are down (00), CUBO contains the binary number of the desired sense bytes which can be generated within the device. CUBI from that device contains the sense byte information. CU selectively gates this information into the microprocessor as described elsewhere. Phase 4 is followed by phase 1 wherein CUBO contains a command for the device, while CUBI supplies acknowledgement information from the device to CU for verification of receipt of CUBO.

Phase 1 is followed by phase 2 wherein both tags are active. This indicates to the device that no information is being supplied over CUBO and that an independent operation can be performed in accordance with the order supplied during phase 1. It should be noted that the order is not executed until a subsequent phase. Then, in phase 3, tag A is inactive and tag B is active, CUBO contains a byte of data for recording on a magnetic tape, for example. CUBI contains status information or read data during a read operation and is dependent upon the information supplied over CUBO during phase 1. During phase 3, all read and write operations are performed. Phase 4, following a phase 3, permits the device to start actions independent of the CU. Normally, phase 4 is the quiescent tag status.

Incoming lines from the device connected to CU1 are over CUBI (control unit bus in) which are supplied to register TN and then processed by microprocessor 43. In the alternative, CUBI signals are supplied directly to data flow circuits 41 for processing under control of the microprocessor 43 to CBI. Examples of such signals are data signals read from a magnetic disk or tape, for example. The present invention concerns the handling of control information; therefore, the signals are all directed to microprocessor 43. For that reason, data flow circuits 41 are not further described.

DESCRIPTION OF MICROPROCESSOR 43

For a complete dissertation on microprocessing, see Microprogramming Principles and Practices, Samirs Husson, Prentice-Hall 1970, Library of Congress Catalog No.

72–122612, and the references cited in the bibliography therein.

The microprogram which determines the logic of operation in microprocessor 43 is retained in read only store (ROS) 48. Each microprocessor cycle, determinated by clock system 49 (not further described, because any clock system can be used), cycles instruction words as shown in FIG. 5 to instruction register (IR) 50. Microprocessor 43 has a plural phase format for multiple interpretations of instruction word permutations. Format 0, as seen in FIG. 5, includes a CK field which contains a constant to be used in microprocessor computations: CB/CD field, which denotes which register SA–BC, respectively, is the source of data signals for B-bus 51 as well as the destination for signals on D-bus 52; B-bus 51 is one input to ALU (adder) 53, while D-bus 52 receives the ALU result signals via D register 54. The OP field determines the function performed by ALU 53 as set forth later in Table I. CX field is an address of the next instruction word to be fetched from ROS 48 within a predetermined zone of such addresses. CH and CL fields are branch on condition fields and are interpreted in accordance with the numerical contents thereof.

Format 1 of the instruction word includes a CA field denoting the hardware registers SA–BC which is a source of one byte of data signals for A-bus 55, the second input to ALU 53. CB field denotes the register SA–BC which is the source of signals for B-bus 51. CA and CB may denote the same register. CD field denotes the destination register for the signals in D-bus 52. The OP, CX, CH, and CL fields are interpreted as described for Format 0.

TABLE I.—INSTRUCTION WORD CODE INTERPRETATIONS

| Field value | OP | CA, CB, CD | CH | CL |
|---|---|---|---|---|
| 0 | A=D | NOP | 0 | 0 |
| 1 | AΩB=D | SA | 1 | 1 |
| 2 | A·B=D | SB | | |
| 3 | AγB=D | SC | D=0 | D=0 |
| 4 | A+B=D | TN | ST0 | ST1 |
| 5 | A−B+1=DC | DB | ST2 | ST3 |
| 6 | A+B+C=DC | CB | ST4 | ST5 |
| 7 | A−B+C=DC | TT | ST6 | ST7 |
| 8 | (Not used) | ST | BR0 | BR1 |
| 9 | | BR | BR2 | BR3 |
| 10 | | EA | BR4 | BR5 |
| 11 | | EB | BR6 | BR7 |
| 12 | | TC | CBIT | BUSY |
| 13 | | CC | TINT | OPIN |
| 14 | | AC | RINT | |
| 15 | | BC | | |
| 16 | | | | |
| 17 | | | | |
| 18 | | | | |
| 19 | | CBO** | | |
| 20 | | DAS* | | |
| 21 | | DAF* | | |
| 22 | | ACF** | | |
| 23 | | ACS** | | |

*CD field only. **CB field only.

In Table I, the field value is set on the left-hand column. The OP field indicates the operation performed within ALU 53. The letter A denotes A-bus 55, letter B denotes B-bus 51, the letter D denotes D-bus 52, the letter C denotes carry from the immediately preceding ALU operation and is contained within ALU 53. Letter DC indicates the result is supplied to the D-bus with any carry being stored in ALU 53. A D without the C indicates carry is not stored. The equal sign (=) indicates the ALU operation with the inputs on the left side and the results on the right-hand side. The Ω indicates "OR," the · indicates "AND," and the γ indicates "EXCLUSIVE OR." The CA, CB, and CD fields for the values listed are all interpreted the same and denote one of the hardware registers SA–BC or a NO–OP, i.e., there is no input or destination respectively for the A, B, or D buses. If the condition indicated by the CH and CL fields are met, the respective next address portion corresponding to CH and CL are respectively set to 0 or 1. An exception is the field values 0 and 1 which unconditionally set the CH and CL portions as shown. For example, if D-bus is equal to 0 for condition 3, then the CH and CL fields will be set to a 1 for the next instruction word address. For the remaining indications, register ST, bit 0 (ST0) will set the CH portion of the next address to 1 if the bit in ST, bit 0, is a 1 and a 0 if it is a 0. The same is for all of the ST bit positions 0–7 and the BR register bit positions 0–7. When the field value in the current instruction word is 12, the letter C denotes if there is a carry from the previous ALU operation, the CH field will be set to a 1. The CL field, equalling 12, branches on the busy condition from the addressed device. If the device is busy, the next instruction word address is set to a 1 in the CL portion; if not, it is set to a 0. Similarly, for the field value of 13, the CH portion of the next address is set to a 1 for trouble interrupt (TINT); with no interrupt, it is a 0. In a similar manner, CL field having a value of 13 branches on OP–IN, CL address bit is set to a 1 if OP–IN is active and a 0 if it is inactive.

IR register 50, having received an instruction word from ROS 48, supplies same to decoder 58. Decoder 58 is the usual decoder found in programmable machines and converts the code permutations in the instruction word to command signals timed by clock 49 in accordance with the interpretations set forth in Table I. In the practical embodiment, there may be a more complete set of instruction word code interpretations than that provided for in the present description. The number of interpretations provided are only those necessary for the successful practice of the present invention.

From decoder 58, command signals are transferred to transfer network 59 for selectively gating signals on D-bus 52 to the appropriate hardware register SA–BC in accordance with Table I CD fields. This, of course, is accomplished at the end of the machine cycle after ALU 53 has supplied its resultant signals to D REG 54. In a similar manner, transfer network 60 consists of sets of gates for selectively transferring signals previously under control of command signals from decoder 58 memorized in the hardware registers SA–BC to A-bus 55, B-bus 51, LSR (local store) 61, as well as from other external sources to the A- and B-buses. For example, CBO is selectively transferred to B-bus 51 under microprogram control (CB=19, TABLE I) via transfer network 60. CK field of Format 0 in IR 50 is supplied to A-bus 55.

Figure 7:
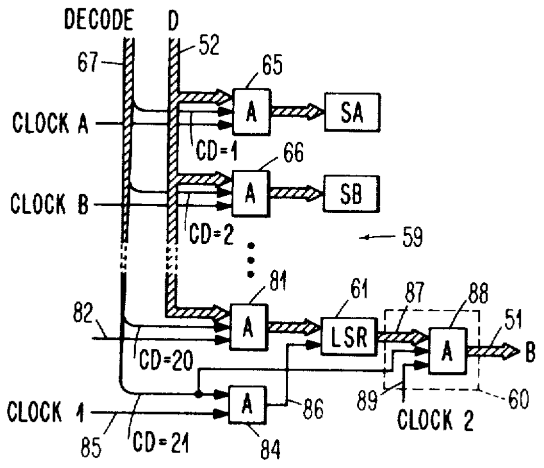
FIG. 7 is an abbreviated logic diagram showing the operation of a transfer net used in the microprocessor.

Referring momentarily now to FIG. 7, an exemplary transfer network is shown in a greatly abbreviated form. Input gating to registers SA and SB is shown in simplified form as sets of AND circuits 65 and 66. AND circuits 65 and 66 receive signals from D-bus 52 and control signals from decoder 58 via decode command signal cable 67. The signals supplied over cable 67 are decoded from the CD field of the instruction word; and one, and only one, line is activated during a clocked portion of a given machine cycle in accordance with well-known and established computer design principles. Registers SA and SB are gated through transfer network 60 in a similar manner.

Transfer network 59, in addition to gating D-bus 52 selectively to the hardware registers SA–BC, also selectively gates signals from CUBI to such hardware registers and signals generated in data flow circuits 41. The latter connections are not shown for simplifying the description.

Field CX is transferred from IR 50 directly over cable 70 to transfer network 71. Transfer network 71 is constructed similarly to transfer networks 59 and 60, but selectively gates code permutations representing the ROS 48 address of the next instruction word. Transfer network 71 selectively sets bit positions in ROSAR (read only store 48 address register) for generating the next address to be used in ROS 48. The same code permutations are supplied directly to ROBAR (read only store backup address register). The latter register is used for diagnostic purposes and is gated to EA and EB hardware registers upon detection of an error. Further, the CH and CL portion 72 of ROSAR is selectively set by branch control 73 in accordance with the decode command signals from the CH and CL fields supplied over cable 74. Branch control 73 directly receives signals from registers ST and BR over cable 76. These signals are selectively gated (similar to the FIG. 7 gating scheme) by the decode instruction word fields on cable 74 to generate the CH and CL portions of the next instruction word address contained in ROSAR. The OP field of the instruction word is supplied over cable 75 directly to ALU 53 for controlling ALU operations as set forth in Table I.

Selected ones of the hardware registers SA–BC are used to supply signals external to microprocessor 43 for controlling operations of ther portions of CU1, as well as supplying signals to either a connected device or a CPU. For example, registers SA, SB, and SC supply signals over cable 80 to data flow circuits 41 for controlling the operational states thereof. Register CB is directly connected through a FIG. 7 type of gating network (not shown) to CBI for selectively transferring sense bytes and other status information contained in CB to the connected CPU. Interpretation of these signals is under the control of CTI signals. Register TT is connected to CUBO via a FIG. 7 type of gating network (not shown) for transferring command signals to the connected I/O device. CUBO also receives write signals supplied by data flow circuits 41. As above explained, registers ST and BR are connected directly to branch control 73. Register TC is connected to data flow circuits 41 plus the TUTO lines 44 for supplying tag signals to the connected I/O device for interpretation of the signals on CUBO. Register CC holds the signals to be supplied over CTI. The latter signals may be gated to CTI only when OPIN is active or may be supplied without gating. The register stage tag assignments are shown later in Table V.

LSR 61 contains images of various registers and temporarily stores bytes of data for use in the microprogram scanning and transferring of interrupt signals, as well as many other functions not pertinent to the practice of the present invention found in a practical embodiment of a machine in which the invention may be practiced. As indicated in Table I, when the CD field is equal to 20 (decimal) or 21, the local storage is accessed for a store or a fetch function, respectively. As shown in FIG. 7, transfer net 59 includes AND circuit 81 jointly responsive to a decode signal received over cable 67 for CD=20 (decimal) and to the D-bus signals as timed by a clock signal inputted over line 82 from clock 49 to supply signals over cable 83 to LSR 61. Transferring signals to LSR 61 causes LSR to store the contents of the D register in accordance with the code permutations in the CA and CB field of the present instruction. For encoding purposes, the instruction is written $A+B=DAS$. Referring to Table I, it is seen that the A field and the B field are combined to form the address for storing the D signals as indicated by CD=20 or mnemonics DAS. Since eight bits are used for addressing LSR 61, the upper four bits of the address are obtained from the upper four bits of the register designated in the CA field, while the lower four bits of the address are obtained from the lower four bits of the address designated by the CB field. This arrangement facilitates indexing and the scan operation. For example, the CA field may designate the EA register; and the CB field may designate the EB register. In this manner, the upper four bits of EA will select the zone in LSR 61 corresponding to the function represented by the data to be stored at the address designated by the lower four bits of EA corresponding to the device address which supplied the data to be stored. This will become more clear with the continued reading of the specification.

In a similar manner, when CD=21 (mnemonic DAF) is designated, a fetch operation is effected. In FIG. 7, AND circuit 84 is jointly responsive to CD=21 received over decode cable 67 and clock period 1 on line 85 to supply an activating signal over line 86 to LSR 61. LSR 61 responds to activating signal on line 86 and to the portions of the registers designated by the CA and CB field to fetch the data word stored at the designated address. For simplicity purposes, the transfer of address signals to LSR 61 is not shown in FIG. 7. It is understood that the usual gating and logic circuits, well known for addressing memories, are usable. The same philosophy and system organization applies to fetching data as described with respect to storing data.

Indexed accessing local store 61 is provided by the CB field decodes equal to 22 and 23 (decimal). A typical instruction to be coded will be written as $E+ACS=D$ and $E+ACF=D$. In the first equation, E represents the emit field contained in the instruction word Format 0, while ACS designates a store address using the upper four bits of the emit field and the lower four bits of the AC register to store the data contents of D REG 54. As will be seen later, the AC register in this lower four-bit portion contains the device address which is associated with a device that has been selected, has supplied an interrupt, and is currently the first device to be serviced with respect to all interrupts received by the CU. In a similar manner, fetch command ACF causes the contents of the register designated by the upper four bits of E and the lower four bits of AC to be supplied to the B-bus. In FIG. 7, LSR 61 supplies signals from the designated register over cable 87 to AND circuits 88 within transfer net 60 (partially shown in FIG. 7) which are jointly activated by the $CD=21$ decode and the clock 2 signal supplied over line 89. As is well known in computer technology, clock 1 signal precedes clock 2 signal by the memory cycle time of LSR 61. A typical memory cycle time may be 150 nanoseconds. Commutation of clock siganls by clock source 49 is well known.

Table II below shows the register assignments for all the hardware registers SA–BC as particularly related to practicing the present invention in the disclosed environment. Table II will be referred to later in the continuing discussion.

TABLE II

Register assignments

SA—Device Status and Control Flags
SB—Device Status and Control Flags
SC—Device Status and Control Flags
TN—Control Unit Bus In (CUBI)
DB—Data Flow Control
CB—Channel Bus In (CBI)
TT—Control Unit Bus Out (CUBO)
ST—Scan Control Register
BR—Scan Control Register
EA—Address Register Channel A
EB—Address Register Channel B
TC—Control Unit Tag Out (CUTO) and Tag Control (TC)
CC—Channel Tag In (CTI)
AC—Status Plus Device Address
BC—Status Table III shows LSR 61 register assignments which correspond respectively to the bit positions in hardware registers SA, SB, and SC.

TABLE III.—LSR MAP OF 10–1F REGISTERS

| Registers | (SA) | (SB) | (SC) |
|---|---|---|---|
| Bit positions: | | | |
| 0 | ATT | A has DEV | SUPPRE QIN |
| 1 | (*) | B has DEV | CHAINED |
| 2 | CUE | DRP | INITSEL'D |
| 3 | BSY | (*) | (*) |
| 4 | (*) | (*) | INTERRUPT |
| 5 | DVE | (*) | (*) |
| 6 | UNC | (*) | A CHANNEL |
| 7 | (*) | (*) | B CHANNEL |

*Not used or not pertinent to machine portion used to illustrate the invention.

Table III shows the device status and control flags, many of which are essential to transferring interrupt signals through a CU to CPU's in accordance with the invention. The LSR assignments are matrixed in accordance with device addresses and the function associated with each device address. For example, in zone 1, the 24-bit LSR registers 10–1F are loaded respectively into hardware registers SA, SB, and SC—eight bits to each of the hardware registers. In SA, bit position 0 means attention; 2 is control unit end (CUE); 3 is busy; 5 is device end; and 6 is unit check. The asterisked bit positions are not necessary for the practice of the present invention.

In SB, bit positions 0 and 1 show that channels A and B, respectively, have reserved a device indicated at the unit's portion of the address. Bit position 2 indicates that error recovery procedure (ERP) is in process for that particular device. This is not necessary for the practice of the invention, but is included to show the type of indicators that are used in the flag registers.

Register SC, bit positions 0–2 show suppressible REQIN and chained initial selection; an interrupt is pending in 4; and the interrupt should be send to A channel or B channel in bit position 6 or 7. If both bit positions 6 and 7 are 0's, then the interrupt can be sent to either channel. If A or B is designated, the interrupt is tagged and can be handled without using the present invention.

SEQUENCING AN INTERRUPT

The sequence of steps followed in practicing the present invention in the above-disclosed environment includes the device raising an untagged interrupt. This untagged interrupt may be a RINT, not ready to read interrupt, indicating that the device is prepared to proceed with data processing operation of a TINT, a trouble interrupt, which indicates attention is needed at the device for some difficulty detected by that device. The device flags an interrupt signal to SDI 14. At SDI 14, the interrupt signal is staticized for scanning by CU1–CU4. During the scan, one or more of the CU's detects the interrupt signal in SDI 14 and logs same in bit 4 position of field 30–3F as shown in Table III. Bit 4 being set to the active condition indicates the interrupt signal has been scanned by the CU in a previous scan cycle. The address of the device is indicated by the register in which the interrupt signal is stored.

The CU's continue their scanning and other operations even though the interrupt signal has been lodged in LSR 61. On the next subsequent scan, during one of the phases as later described, CU detects the LSR bit 4 in zone 3 and then sets the appropriate bit positions in register CC. See Table IV.

TABLE IV.—REGISTER BIT ASSIGNMENTS

| | First half bit positions | | | |
|---|---|---|---|---|
| | 0 | 1 | 2 | 3 |
| Register: | | | | |
| ST | R'vd to A | R'vd to B | (*) | (*) |
| BR | (*) | A-NSUPPRI | B-NSUPPRI | (*) |
| TC | Tag A | Tag B | DEVSEL | (*) |
| CC | STIN | A-SUPPRI | A-NSUPPRI | OPIN |
| AC | CUBA | BUBB | (*) | ADDRI |
| BC | CUEA | CUEB | (*) | (*) |
| | Second half bit positions | | | |
| | 4 | 5 | 6 | 7 |
| ST | INT | (*) | STA | STB |
| BR | (*) | (*) | SCAN | SCAN |
| TC | (*) | (*) | READ | WRITE |
| CC | (*) | SVCI | B-SUPPRI | B-NSUPPRI |
| AC | DEVADDR | DEVADDR | DEVADDR | DEVADDR |
| BC | (*) | (*) | (*) | (*) |

Register CC and supplies CTI signal REQIN. If an interrupt is received and detected and then transferred from LSR to CC by setting bit position 1, a suppressible REQIN signal is supplied over CTI. If bit 2 position is set, a nonsuppressible REQIN signal is supplied. Simultaneously, the OPIN signal in bit 3 is set to the active condition supplying that signal to CTI. The CPU's connected to channel A respond to the OPIN signal and the REQIN signal to initiate initial selection procedures by supplying a SELO signal.

Simultaneously, with transferring the interrupt signal from LSR 61 to CC, the device address associated with the interrogated LSR register is stored in EA for the A channel and in EB for the B channel.

CU continues to scan if the interrupt resulted in a suppressible REQIN; then, the next interrupt detected in LSR 61 will erase the device address in EA/EB and replace it with the device address associated with the latest scanned interrupt signal. This replacement occurs until a nonsuppressible REQIN is detected. Then, register BR, bits 1 or 2 for channels A and B respectively, are set to the active condition. The microprogram always scans the BR register to detect whether or not there is a nonsuppressible REQIN before transferring the interrupt signal from LSR 61 to CC.

The register flag interpretations are set forth in Table V below.

TABLE V.—REGISTER TC TAG CONTROLS

| TAG A | TAG B | DEVSEL | SWSEL | Interpretation |
|---|---|---|---|---|
| 0 | 0 | 0 | 1 | Scan. |
| 0 | 1 | 0 | 1 | Do. |
| 1 | 0 | 0 | 1 | Reset Commit Latch. |
| 1 | 1 | 0 | 1 | Set Enable/Disable. |
| 0 | 0 | 1 | 0 | Normal DEVSEL. |
| 0 | 0 | 1 | 1 | DEVSEL and Look at Hold From Other CU's. |

NOTE.—AC2 On=Inst. Alleg. out to other CU's.

The significance of the bit assignments set forth in Table IV will become apparent from a continued reading. The asterisks again denote those bit positions which either are not used or used for purposes other than that necessary for an understanding of the present invention.

Upon any CPU responding to either a suppressible or nonsuppressible REQIN, the CPU sends a SELO. This initiates initial selection routine within the CU. During this sequence, the CU again checks the interrupt status at SDI 14. If the SDI 14 interrupt status is still pending and the device is not busy, then SDI 14 sets a commit latch; and the CPU is permitted to make a connection to the interrupting device. The CU then indicates possible selection to CPU by raising STIN and sending a byte of status information over CBI.

However, if the interrupt is still pending in SDI 14 and the device is already committed, as indicated by the commit latch set by another CU, the CU raises STIN and sends all 0's over CBI. This indicates to CPU that even though a REQIN has been serviced by that CPU, no action can be presently taken. In this manner, duplication of interrupt handling is avoided.

While one CU may be handling an interrupt signal from a device, the other CU's continue to scan SDI 14 for interrupt signals. The scan interrogates the interrupt status in SDI 14 even though it may have been lodged in LSR 61 in the respective CU's. Upon the handling of an interrupt signal and the status being erased in SDI 14, the I/O scan by a CU will detect that the interrupt signal has been erased. It then erases the interrupt recorded in LSR 61 registers 10–1F thereby preventing that CU from further handling any interrupt that was previously logged and now serviced. If that happens to be the only interrupt that is pending, then a device address recorded in EA or EB is erased.

CU INTERRUPT SCANNING

Figure 8:
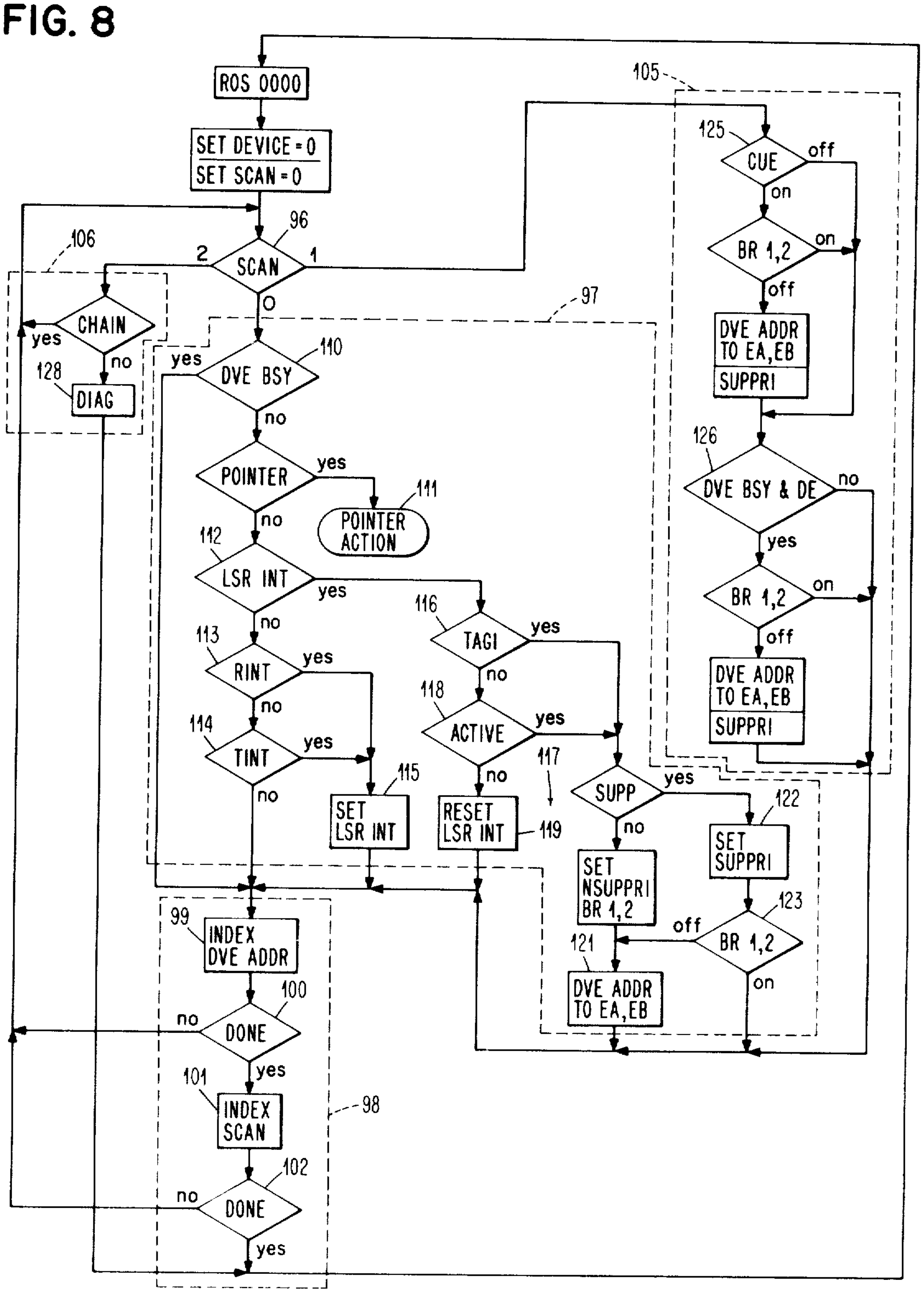
FIG. 8 is a memory map showing the local storage (LSR) assignments and a diagrammatic showing of the priority system used in the controllers for effecting interruption signal handling.

The general microprogram arrangement usable with the illustrated embodiment is shown in block form in the IBM Technical Disclosure Bulletin, January 1971, on pages 2363–2365. FIG. 8 expands the scan point 11 of that article and shows in detail how the interrupt handling is transferred through successive scans effected by the CU. The actual transfer of signals is explained later with respect to FIG. 9 which shows in simplified form SDI 14 circuits as they relate to circuitry of the CU as shown in FIGS. 3 and 4.

Referring firstly to FIG. 8, the scan sequence is started at ROS address 0000. This register is accessed by branch instructions branching to this address or by a trap signal supplied over line 95 (FIG. 4) which, through transfer network 71, generates all 0's in ROSAR. The rest of the blocks in FIG. 8 represent sequences of microinstructions performable in the FIG. 4 illustrated microprocessor for effecting the functions now described.

Initially, the device address and scan level are set to 0's. This is accomplished by clearing the lower half portion of AC for device address 0 and clearing the scan level bits BR–6 and BR–7 (Table IV). In decision step 96, scan level is interrogated by branching on BR–6 and BR–7. Since they were cleared to zero, the scan level 0 is followed as shown in dash box 97. Insofar as handling untagged interrupts, scan level 0 acquires the interrupt information from SDI 14 and stores it into LSR 61. For multitagged and untagged interrupts, this scan level may transfer the interrupt signal to the appropriate CPU and setting suppressible or nonsuppressible REQIN.

Scan level 0 is repeated once for each device attached to the CU. If there are 16 devices, the routine in dashed box 97 is repeated 16 times before the scan is indexed to scan level 1. Indexing routine 98 is performed following each time routine 97 is performed. Routine 98 indexes the device address each pass through 97, as at 99. Decision step 100 determines whether or not all of the attached devices have been scanned. This is provided in the microprogram by storing a constant equal to the number of devices in an appropriate LSR register or in an emit field in one of the instructions. If the scan is not completed as to all of the devices for level 0, the routine returns to step 96. If it is completed, the scan is indexed at 101 to the next level. In step 102, the microprogram determines whether or not the scan is complete. If it is not complete, it returns to step 96.

When the scan has been completed, i.e., three levels have been performed, ROS instruction at 0000 is re-executed. The microprogrammed CU repeatedly scans for interrupts that may be asynchronously supplied to any of the attached devices. The CU leaves the FIG. 8 illustrated scan routine by being trapped to a ROS address other than that used in the scan routine. For example, initial selection first instruction word may be found at ROS address 0123. When the CPU supplies a SELO signal, hardware circuits (not shown) generate a ROS address 0123 and force it into ROSAR through transfer network 71 in the same manner that all 0's were forced into ROSAR.

Upon completion of scan level 0, scan level 1 indicated in dashed box 105 is performed. Scan level 1 looks for stacked interrupts which can be handled after a control unit end (CUE). If BR–1 and BR–2 indicate there are no nonsuppressible REQIN's, then a suppressible REQIN is supplied to CPU in scan level 2. Device busy is also checked in the event that there are interrupts pending and the device became busy because of other activity. Indexing routine 98 is repeated for scan level 1 as it was for scan level 0.

The third scan level, scan level 2, is shown in dash box 106. This detects chained operations and enables the performance of diagnostic functions of no importance to the present invention.

From the above, it can be seen that the interrupt from a device is detected during a first scan. Upon execution of the second scan through all three levels beginning at ROS=0000, the interrupt is then supplied from the CU to the CPU by raising either suppressible or nonsuppressible REQIN.

Scan level 0, shown in dash box 97, first checks for device busy at 110. This is done by sending appropriate later-described signals to SDI 14. If the device is busy, no connection can be made to the device; indexing routine 98 is directly entered. If it is not busy, pointers in LSR 61 are checked. As described in the IBM Technical Disclosure Bulletin article, supra, a pointer in a designated register indicates that a segmented microprogram action is to be taken. When a pointer is present for the device being scanned, the pointer action is taken at 111. If there is no pointer, the program in step 112 senses bit position 4 of register ST (ST–4) for determining whether or not an untagged interrupt has been received during a previous scan cycle. If it has been, then the interrupt is transferred to the CPU as described later.

Without an interrupt indicated in ST–4, the CU then scans SDI 14 for a ready interrupt (RINT) and a trouble interrupt (TINT) in steps 113 and 114, respectively. If either of these interrupts are sensed in SDI 14 for the device being scanned, ST–4 is set to the active condition in step 115. If neither interrupts are active in SDI 14, index routine 98 is entered.

Whenever ST–4 indicates an interrupt (set to a binary 1), the microprogram in step 116 detects whether or not the interrupt is tagged. A tagged interrupt is one which designates a particular CPU to handle the interrupt. The multitagged interrupt is one in which all CPU's connected to the system must service the interrupt. The type of interrupt being handled by the present invention is an untagged interrupt. This means that any CPU can service the interrupt with the first CPU then erasing the interrupt such that the interrupt is only serviced once. If it is a tagged interrupt, then sequence of steps 117 is executed. These steps transfer the interrupt to the CPU in accordance with untagged and multitagged procedures not further described in detail.

If the interrupt is untagged, then in step 118, the CU goes to SDI 14 and determines whether or not the interrupt is still active. If it is not active, this means another CU has already serviced the interrupt. In that case, ST–4 and the appropriate bit in LSR are reset in step 119; index routine 98 is entered. However, if the untagged interrupt is active, then the untagged interrupt may have to be handled by the scanning CU. Sequence of steps 117 is then performed.

In sequence 117, the microprogram first determines whether or not the interrupt is suppressible. If it is nonsuppressible, then stages 1 and 2 of register BR are set indicating that a nonsuppressible REQIN is being handled. A nonsuppressible STIN is also set for either A channel or B channel. For A channel, this is CC bit 2; and for B channel, it is CC bit 7 (Table IV). A latch (not shown) within the CU designates whether channel A or channel B is active. This latch is then used to set various status flags as shown in Table IV. Then, the device address in low 4-bit positions of AC are transferred to EA or EB in accordance with channel A or channel B activation as shown in step 121.

If the interrupt is suppressible, then in step 122, the microprogram sets the suppressible REQIN tag CC–1 for the A channel and CC–6 for the B channel. Then, the microprogram step 123 determines whether or not BR–1 or BR–2 are set indicating a nonsuppressible REQIN has been supplied to the appropriate CPU. If it has been, then the address in EA or EB cannot be updated; and index routine 98 is directly entered. However, if there are no nonsuppressible REQINs, i.e., BR–1 and BR–2 are both cleared to zero, the device address is supplied either to EA or EB in step 121; and then the indexing routine 98 is entered.

Upon completion of all 0-level scans, the microprogram then enters routine 105 for executing the scan level 1. In step 125, the microprogram senses for control unit end (CUE). This branch is performed by sensing LSR bit position 2 in registers 10–1F for the various devices. A CUE signal is generated by the CU previous to the scan cycle. This status bit in LSR registers 10–1F is set whenever the CU has completed an operation during which a tape control busy was indicated (CUB), or whenever the CU completed an operation during which the CU was busy and a unit check or unit exception was detected by the CU, or whenever a command is completed on the alternate interface (A or B) of a so-called simultaneous read/write control that caused a busy signal to be supplied to an interrogating CPU. CUE, as defined, has been used in IBM tape units; and the above definition fits the previous operation of those units.

Assuming there is a CUE, then the BR stages 1 and 2 are sensed for determining a nonsuppressible status. If there is nonsuppressible status, then device busy is checked in step 126. Without nonsuppressible status, the device address of the device being scanned is supplied to either EA or EB; and suppressible REQIN is activated by setting CC–1 or CC–6 in accordance with channel A or B. Then, step 126 is performed.

In step 126, the microprogram determines whether a previously interrogated device has been busy and a device end (DE) has now been received. DE indicates that the device connected through SDI 14 and being scanned is now ready for further action. If the indication is negative, then routine 98 is entered. If DE has been received, then nonsuppressible status is checked by sensing BR–1 and BR–2. If these are on, then nothing further can be done; and routine 98 is entered. However, if they are off, the device address being scanned is supplied to EA or EB; and suppressible REQIN is initiated by setting CC–1 or CC–6.

Scan level 2 checks to see if the CU is chained to one of the CPU's. This means any chain latch (Table III, register SC bit 1) has been set. If there is chaining, ROS address 000 is accessed to reinitiate scan unit 0. Chained operation are known from the I/O channels on the IBM 360 Series of computers. If chaining is not in effect, then diagnostics can be performed in step 128. Upon completion of diagnostics 128, ROS 0000 is again accessed repeating the just-described operation.

SDI 14

Referring next to FIG. 9, the operation of SDI 14 in conjunction with the devices and CU's 1–4 is described. SDI 14 consists of many crosspoint switches and the like as set forth in PAT. 3,372,378. A few changes have been made in the illustrated embodiment, and one crosspoint between one CU and one device is illustrated in simplified form for illustrating how the interrupt signal is transferred from the device to the CU. It is understood there is one such circuit, such as circuit 130, for each crosspoint between the CU's and devices. That is, for a four CUTO 16 device SDI, there are 64 such circuit arrangements. The circuit arrangements for the crosspoint between CU–1 and D–1 is shown in detail with the other crosspoints from CU–1 to D–2 through D–16; and CU–3 and CU–4 to D1 to D16 represented by box 131.

The purpose of SDI 14 is to establish communication between any one of the four CU's with any one of the 16 devices. To this end, crosspoint switches 132 selectively connect cable 133 from the CU, which is ten lines representing CUBO, tag A, and tag B lines to any device over cable 134. Similarly, CUBI and other lines not mentioned herein from the devices are represented by cable 135 and are selectively switched to any one of the four CU's on cable 136, for example, which is CUBI in FIG. 3. It is understood that for each CU there are 16 cables 134 and 135. If there are four CU's, then for each device having a cable 134 and 135, there are four cables 133 and 136 as well as four sets of crosspoint switches 132. Those switches can be constructed as described in Pat. 3,372,378. The operation of these switches is not germane to the transferring of interrupt signals received from the device to the CU.

RINT, i.e., the ready untagged interrupt, is a device end signal received over line 140 from the device and supplied to a set of AND/OR circuits 141 which are selectively gated under CU control as will become apparent as RINT on line 157. The trouble untagged interrupt (TINT) is supplied over line 142 to CU and detected by the microprogram whenever the CH field is equal to 13 (decimal) as set forth in Table I. Accordingly, signals on lines 142 and 157 of FIG. 9 are supplied to branch control 73 of FIG. 4 for controlling AND circuits therein as shown in FIG. 7. These connections in FIG. 4 are not shown for clarity purposes.

For TINT, the devices send an attention or unit check signal over line 143 to AND circuit 144. That signal is gated under CU control to generate the TINT signal on line 142. It should be remembered that the attention and DE signals are sent to all four crosspoints associated with a given device. To generate TINT on line 142, AND circuit 144 is jointly enabled by the output of AND circuit 155, i.e., the crosspoint was enabled and has been selected, and gate device enabling signal on line 159 (later described) plus the unit check or attention signal on line 143.

The crosspoint is selected by CU sending address signals in AC 4–7 over lines 145 to all crosspoints, each of which has an address decode 146 unique to each of the respective crosspoints. Upon detection of the appropriate address, an activating signal is supplied over line 147 to enable AND circuit 149 for permitting operations in accordance with the DEVSEL and SWSEL tag signals from TC–2 and TC–3 received respectively over lines 150 and 151. These selecting tag signals are OR'd in circuit 148 to cojointly activate AND circuit 149 to emit a crosspoint selecting signal. During the scan, TC–3 is activated for a switch select (SWSEL) signal supplied through OR circuit 148 as well as to OR/NOT circuit 152. AND circuit 155 is jointly responsive to the AND circuit 149 emitted crossjoint selecting signal and an enable signal from enable and disable logic circuit 156 (later discussed) to gate status to CU.

To generate RINT on line 157, AND circuit 155 supplies its enabling signal to AND circuit 158 in AND/OR block 141 which combines same with DE signal on line 140 and the enable signal on line 159. The other two AND's in block 141 are enabled for different purposes as later discussed. In a similar manner, the busy signal on line 162 is generated by AND/OR block 160 being responsive to the AND 155 signal plus the circuit 156 enable signal to supply the busy signal received from the device over line 161. The microprogram in the CU senses the condition of line 162 in branch control 73 whenever the CL field equals C (hexidecimal).

Whenever the SWSEL line 151 is active, then switch status is being requested by the microprogram—that is, is the crosspoint available, has it been committed, and is it enabled or disabled in accordance with the logic of circuits 156? Insofar as the present invention is concerned, the operational significances between switch and device status are not pertinent.

Relating FIGS. 4, 8, and 9 together, step 113 (FIG. 8) checks the ready interrupt in branch control 73. RINT on line 157 is generated in the FIG. 9 illustrated circuitry in response to a device input on line 140. In a similar manner, the TINT step 114 is performed in branch control 73 in response to signals on line 142 in the FIG. 9 illustrated circuitry. Device busy checking in step 110 results from branch control 73 sensing the signal on line 162 of FIG. 9. The point checking and LSR interrupt checking are done by fetching the appropriate bytes from LSR 61 and are performed entirely within the FIG. 4 illustrated microprocessor.

UNTAGGED INTERRUPT INTERPRETATION

Figure 10:
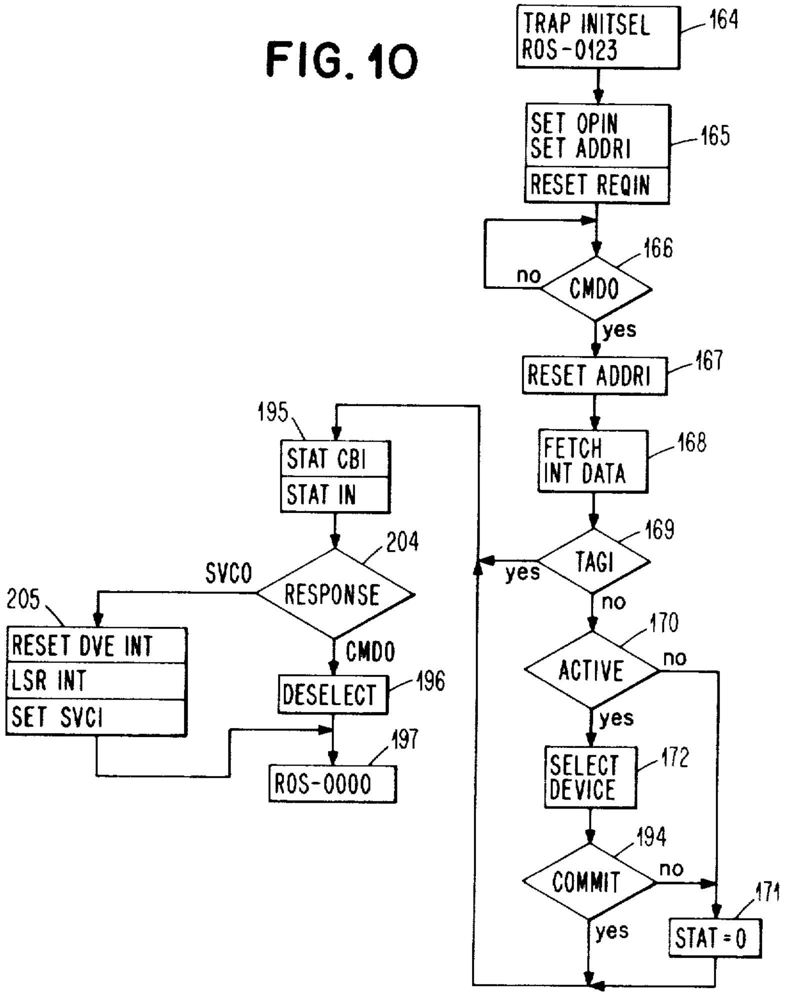
FIG. 10 is an overall flow chart of the microprograms used in the microprocessor.

With joint reference to FIGS. 4, 8, 9, and 10, the sequence of operation and detailed operation of the circuits transferring the interrupt signal once lodged in LSR 61 to the CPU via suppressible or nonsuppressible REQIN, response of the CU as set forth in FIG. 10, and the subsequent interrogation by the activated CU with respect to SDI 14, is described in simplified detail. After an untagged interrupt has been lodged in LSR 61, the next scan through routine 97 effects transfer of that interrupt signal to the channel connecting the scanning CU to CPUA. Of course, if prior interrupts have been received, the nonsuppressible or suppressible REQIN signal would have been activated. Repeated setting of the register position of CC merely maintains the REQIN signal. When the connected CPU responds to the REQIN, it sends a SELO signal over CTO to CU–1 hardware circuits including decode circuits within transfer network 71 and responds to SELO as a trap signal on line 94 to preset ROSAR to address 0123 for initiating initial selection microprogram shown in FIG. 10 beginning at step 164. First, the microprogram executes step 165 wherein OPIN is activated by setting bit 3 of register CC. OPIN indicates to CPU that CU has received SELO. It also activates ADDRI (address in) by setting bit 3 of register AC. ADDRI informs CPU that the signals supplied over CBI are the address of the device which generated REQIN. Simultaneously, REQIN is dropped by resetting the appropriate bit position of register CC, i.e., either bits 1, 2, 6, or 7. CU now must wait for the CPU to respond with a CMDO (command out) as shown in wait loop 166. Upon receipt of CMDO, CU resets bit 3 of register AC in step 167 for dropping ADDRI. Simultaneously, the address of the interrupting device is removed from CBI. CU then fetches the interrupt data in step 168 from local store 61 in accordance with the device address in either EA or EB as the case may be. This data will include whether the interrupt is tagged, multitagged, or untagged. The branch by the microprogram in step 169, when untagged, then goes to SDI 14 in step 170 to determine whether or not the untagged interrupt is still active. Branch control 73 responds to the interrupt condition on either line 142 for a TINT or on line 157 for a RINT in accordance with the data set forth in either EA or EB. If the interrupt has been serviced by another CU, it is no longer active; and the status byte to be forwarded to the CPU is set to 0 in step 171.

On the other hand, when the interrupt status is active as indicated by such signals, the CU selects the device in step 172 by activating DEVSEL line 150 of FIG. 9. AND circuit 149 then supplies an activating signal to AND circuit 180. AND circuit 180 tests whether or not the device corresponding to the crosspoint circuit 130 can be selected. The DEVSEL signal is supplied directly over line 181 to AND circuit 180 and is combined with AND circuit 149 signal, the enable signal from enable/disable logic 156 on line 182, plus the not committed signal on line 183 received from other portions of SDI 14. The latter signals indicate that neither CU–2, CU–3, nor CU–4 have committed the device. Generation of the committed signal is later described.

When all of the above conditions are satisfied, AND circuit 180 supplies an activating signal over line 185 setting commit latch 186 and simultaneously actuating crosspoint switches 132 to effect an electrical signal connection between cables 133 and 134 and between cables 135 and 136. CU–1 is now connected to device D0.

If commit latch 186 and any of the other portions 131 were active, then AND circuit 180 would never have been enabled. In a similar manner, commit latch 186 of crosspoint circuit 130 supplies its committed active signal over line 187 to all of the other portions of SDI 14 indicating that device D0 has been committed by crosspoint 130 to CU–1. Simultaneously, commit latch 186 supplies its committed signal to a pair of AND circuits 188 and 189. These AND circuits are jointly responsive to the channel latch 190, indicating A or B channel, plus the commit latch and the busy signal on line 161 received from device D0 to indicate that the device has been dedicated to either channel A or B via CU–1 respectively over lines 191 or 192. Signals on these lines are supplied to branch control 73 in the same manner as other status signal lines.

In decision step 194 (FIG. 10), CU–1 determines whether or not a commit signal had been received over either line 191 or line 192 in accordance with whether channel A or channel B was activating the request. If the commit latch 186 had not been set and no commitment had been made by D0 to CU–1, then the status supplied to the connected CPU is set to zero in step 171. If there is a commitment, step 171 is not performed, and the interrupt associated status is supplied to CBI by the STIN signal being raised in step 195. STIN signal on CTI is received from bit position 0 of CC. This tag signal indicates that the signals on CBI represent status of the selected device D0. CU–1 must then wait loop (not shown) for a response from the connected CPU before proceeding. If the response is CMDO (command out), this indicates the CPU desires not to proceed further with any activity. CU–1 then deselects D0 in step 196 and returns to the scan of FIG. 8 by accessing the instruction word ROS address 0000 in step 197.

Deselection is effected in the FIG. 9 portion of SDI 14. This is accomplished by CU–1 sending a reset signal over line 201 to logic circuit 156 to reset commit latch 186 to the inactive condition via OR circuit 200. Commit latch 186, when reset, disables or opens crosspoint switches 132 and removes the commit signal from line 187 thereby enabling any unit to select D0 through the respective crosspoint portions.

Circuit 156 responds to the reset signal to change the signal on line 182 to a deactivated state thereby disabling AND circuit 180. Inverter circuit 202 inverts the disabled signal to an activating signal which is supplied through OR circuit 200 resetting commit latch 186. Instead of inverter circuit 202 being responsive to the signal on line 182 for setting/resetting commit latch 186, logic decode circuits may be used such as those combining the reset signal on line 201 together with the OR circuit 148 output signal to reset commit latch 186.

In the event CPU responds with a service out (SVCO) for decision step 204 (FIG. 10), CPU wishes to proceed with some activity with respect to D0. In this instance, step 205 is performed wherein CU resets device interrupt in LSR 61 and the interruption signal in device D0 by sending appropriate command signals through crosspoint switch 132 to D0. At the same time, SVCI (service in) is supplied to CPU acknowledging receipt of SVCO. The CU then returns to ROS address 0000 to await further action by CPU.

A further feature in SDI 14 together with CU's 1–4 and devices is the "hold" feature. The hold feature indicates to all CU's that when attempting to select a device via a crosspoint circuit that the crosspoint and the device are not immediately available. However, the function being performed by the CU which has selected the corresponding device will soon be deselecting. Therefore, the CU will wait until HOLD signal is removed; and then selection is effected. This arrangement is useful when a test I/O (TIO) situation occurs. CU–1 supplies its HOLD signal over line 210 to AND circuit 211 of FIG. 9. AND circuit 211 is jointly responsive to the HOLD signal, plus the commit latch 186 being set and the select signal from AND circuit 149 to supply the HOLD signal via OR circuit 212 to all portions 131. Other CU–1 portions for D2 through D16 also supply their HOLD signal to the CU–2, CU–3, and CU–4 portions. In a similar manner, the HOLD signals from these portions are supplied over line 213 to crosspoint circuit 130. Inverter 214 indicates there is no HOLD signal being received on line 213 and is supplied to AND/OR block 160. AND circuit 215 in this AND/OR block is responsive to the "not hold" signal, plus AND circuit 149 select signal and the line 216 signal (disable) to supply the busy signal on line 162. This response indicates to the interrogating CU that the crosspoint circuit is busy.

The two additional AND circuits to AND 158 in AND/OR block 141 for generating the RINT signal on line 157 are respectively jointly responsive to the AND circuit 155 output signal indicating address selection and enablement plus the commit latch being reset to generate the RINT signal. Additionally, the center one of the AND circuits is jointly responsive to the DE signal on line 140, plus the enable signal from AND circuit 155 and the OR/NOT signal from OR/NOT circuit 152 to generate RINT.

SUMMARY

Practicing the invention in the illustrated embodiment is shown as coordinating untagged interrupt handling between a pair of CPU's, four CU's, and 16 devices. A method of scanning logged interruption signals in the various local stores of the CU's and the subsequent handling of the interrupt signal through the CPU–CU interface in accordance with predetermined architectural requirements shows an effective way of expeditiously handing untagged interrupts. It should be noted that most of the hardware is used for other purposes and functions not described in the present description because of no relationship or pertinency to the successful practice of the present invention. The invention is facile handling of untagged interruption signals in that it is entirely microprogram controlled in the various CU's in a manner to prevent duplicate handling.

It should be further understood that the interconnection between the CU's and the various devices need not be by SDI 14. A connection device such as SDI 14 need not be employed. The devices may be connected directly to the various CU's with other types of interconnection switching means utilized. Also, the interface between the CPU's and the CU's is one of arbitrary choice; and the invention can be practiced using any such interface which effects exchange of signals between such devices.

Insofar as certain aspects of the invention go, the particular microprogram scanning arrangement described with respect to FIG. 8 can be replaced with hardware scans or other forms of microprogramming. It is felt that the particular scan is a facile way of handling untagged interrupts and forms a different aspect of the present invention in addition to the broad concepts involved with untagged interruption between a plurality of devices independent of the internal operation of the various CU's effecting signal interconnections between a plurality of devices.

While the invention has been particularly shown and described with reference to a preferred embodiment thereof, it will be understood by those skilled in the art that various changes in form and details may be made therein without departing from the spirit and scope of the invention.

What is claimed is:

1. A data processing subsystem having a plurality of peripheral devices, a switching system for selectively connecting any of said devices to any one of a plurality of independently operable controllers, each of said controllers being independently connectable to a different data processing system, each device having busy and not busy operational states and capable of supplying an interruption signal, the improvement including the combination:

first means in each of said controllers for scanning said switching system for detecting an interruption signal from any device;

second means in each of said controllers in communicative relationship to such data processing system and responsive to an interruption signal from any of said devices to attempt initiating device selection for connecting said interruption signal-supplying device to a given data processing system by interrogating said given data processing system; and control means in each controller for sequencing operation thereof and including sensing means responsive to said given data processing system to sense whether or not a device which sent an interruption signal is busy or not busy; device selection means responsive to said interruption signal-supplying device being not busy to select said interruption signal-supplying device for said given data processing system and nal-supplying device being busy to supply a set of signals to the data processing system indicating no action need be taken on the interruption signal.

2. The apparatus set forth in claim 1 wherein each said control means is responsive to a selection signal from such data processing system to actuate said device selection means for interrogating said device which supplied said interruption signal for selecting said device, and each second means in the respective controllers independently supplying signals to the data processing system upon detection of an interruption signal whereby possible multiple interruption indications are supplied to such data processing system that a single interruption signal has been received.

3. The apparatus set forth in claim 2 wherein each said controller has a register dedicated to each of said devices capable of storing signals therein indicating whether or not an interruption signal has been received;

each device having an interruption line for carrying an interruption signal;

said first means in each said controllers repeatedly scanning the interruption lines and further reading each said respective controller register and upon detection of an interruption signal recorded in said respective register, address means responsive to said first means detecting an interruption signal to generate a set of signals indicating the address of the device supplying said interruption signal, means in said second means operating to supply during a subsequent scan repetition of said first means an interruption indicating signal to a data processing system; and said address means including means replacing the previously generated device address signal upon subsequently scanning a recorded interruption signal such that the last-scanned interruption signal in the respective register is supplied to a data processing system irrespective of when the last-scanned interruption signal was generated.

4. The apparatus set forth in claim 3 wherein said selective devices supply two classes of interruption signals, one a suppressible and the second a nonsuppressible, said first means including means responsive to receipt of an interruption signal to classify same as to said classes and inhibit means responsive to a nonsuppressible interruption signal to force said address means to lock the device address in the respective register and further responsive to said nonsuppressible interruption signal being relayed to a data processing system by said second means to release said respective register to receive a new device address.

5. The apparatus set forth in claim 1 wherein each said controller control means has a microprocessor including each said respective register having a resident microprogram means operating said microprocessor for coordinating operation of said controller;

said first means including separate electronic circuit means for repeatedly scanning for said interruption signals from said devices and transferring any detected interruption signals to said respective register, said microprogram program means controlling said transfer; and said second means further including a second microroutine means in said microprocessor scanning for said memorized interruption signals in each said respective register on a repeated basis in conjunction with the first scan and said responding means including microprogram step means responsive to a detected memorized interruption signal to supply a request signal to a data processing system for initiating device selection.

6. The apparatus set forth in claim 5 further including a local operating store in each said microprocessor, a set of registers in each said local store dedicated to said devices for retaining status signals including each said respective register memorized interruption signals;

additional register means in said microprocessor for retaining a device address generated by said address means; and said second means including a microroutine means in said microprocessor operative upon detection of an interruption signal in one of said designated local store registers to insert a device address in said additional register means associated with the last-detected memorized interruption signal.

7. The apparatus set forth in claim 6 further including BR register means in said additional register means in said microprocessor for containing status signals indicating whether a nonsuppressible status has been associated with an interruption signal supplied to a data processing system, status signals in said registers of local store indicating whether or not any interruption signal associated with a given device is to be suppressible or nonsuppressible, said second means microroutine means operative to set said BR register means to nonsuppressible status state upon nondetection of both an interrupt signal and a nonsuppressible status signal in any one of said designated local store registers, and including programmed step means responsive to said BR register indicating a nonsuppressible request in to maintain the device address in said additional register until said nonsuppressible status state in said BR register means has been erased.

8. The apparatus set forth in claim 7 wherein each said microprocessor additional register means includes a plurality of register means having connections to said data processing system and to said devices, other registers having no connections externally but containing status signals on which said microroutine means may branch and including said BR register means, one of said registers containing a chain latch;

an additional microroutine means sensing said chain latch and, if not chained, effecting a diagnostic routine and, if chained, actuating said first means scan; and branch control means including scan level indicators in one of said registers for sequentially initiating said first and second means operations.

9. The apparatus set forth in claim 8 wherein said microprogram means further includes routine means actuating said control means and operative in response to said select signal from a data processing system for fetching the interruption data from said local store and including microprogram means when sensing whether or not the interrupt status is still pending and whether or not the interrupting device is busy or not busy and, if busy, setting a sense byte in one of said registers to all 0's and then actuating said responding means.

10. The apparatus as set forth in claim 9 wherein said first means microroutine means is operative during scanning for said interruption signal upon detecting a lack of an interruption signal to reset said respective register in accordance therewith and then sense whether or not any other interruption signals are pending—if not, removing said interruption signal from a data processing system.

11. The apparatus set forth in claim 1 wherein each said controller, via its interruption signal-supplying means supplies a request signal to such data processing system independent of each and every other controller for each interruption sensed by said first means;

means memorizing scanned interruption signals;

such data processing system supplying a select signal to each said controller in responese to said request signals independent of each and every other select signal, respectively;

each said controller including means being responsive to each received select signal supplied in response to a request signal, respectively, for initiating interrogation of the current interruption status of the interrupting device and each controller being independently operable if the interrogated device is not busy to initiate selection and further operative, if the device is busy, to indicate zero status to such data processing system; and including erase means further operative upon a subsequent repeated scan by said first means of not detecting an interruption signal to erase the memorization thereof in the respective controller.

12. An I/O controller adapted to operate in a multicontroller data processing subsystem wherein one of a plurality of I/O controllers is connectable to one of a plurality of I/O devices and each I/O controller being independently connectable to a data processing system, the improvement in an I/O controller including in combination:

first scanning means scanning said I/O devices for interruption signals, first register means for each of said devices for memorizing the signals indicating an interruption and whether or not said interruption is in a first or second class of interruptions, second scanning means scanning said registers for said memorized interruption signals, additional register means for containing the address of a device having supplied an interruption signal stored in one of said first register means, and said second scanning means scanning said first register means and responsive to detection of an interruption signal therein to place the address of the last-scanned device in said second register means and further responsive to an interruption signal being in the second class of interruptions to maintain such device address in said second register means until said second class interruption signal has been removed.

13. The I/O controller set forth in claim 12 further including microprogram means having plural subroutine means constituting said first and said second scanning means and other routine means for effecting other functions including communication between a data processing system and I/O devices, said microprogram means being responsive to an interruption signal being memorized in said first register means to supply a request signal to a connected data processing system and being subsequently responsive to the data processing system for initiating selection of the I/O device indicated in said additional register means, and said microprogram means including routine means being further operative to select said I/O device when a not busy state is supplied thereby and further operative to erase the interruption memorized in said first register means upon detection that the I/O device is no longer supplying an interruption signal and having routine means further operative to establish no action code for being supplied to a data processing system in the event the interruption signal erasure is detected after a data processing system has replied to said request signal.

14. The I/O controller set forth in claim 13 further including:

priority means in said I/O controller settable by said microprogram means and said microprogram means responsive to said priority means being set to inhibit updating the address in said additional register means.

15. The method of operating a multiple unit data processing system having a plurality of independently operable data communication paths, each said path including control lines, the data processing system having first, second, and third sets of units, any one unit in said second set being capable of establishing selective communication between units in said first and third sets in response to control signals supplied over said control lines, each unit in said second set having memory elements, the improved method including the following steps in combination:

generating an interruption signal in one of said units in said first set, supplying said interruption signal over control lines to all units in said second set, asynchronously and repeatedly scanning said control lines for said interruption signals and upon detecting an interruption signal independently memorizing same in said memory elements in each said second units, asynchronously and repeatedly and independently scanning said memory elements in each said unit in said second set, upon detecting a memorized interruption signal sending a request signal from any said unit in said second set to any connected unit in said first set, asynchronously and repeatedly scanning said units in said second set for said request signals for each unit in said first set, upon detecting a request signal in any unit in said first set attempting to select the one unit in said third set via one unit in said second set, and attempting to connect said one unit in said third set to said one unit in said second set, and either establishing such connection or when no such connection is made sending a signal to said one unit in said first set that no action can be taken and erasing the memorized interruption signal in said one unit in said second set.

References Cited

UNITED STATES PATENTS

| | | | |
|---|---|---|---|
| 3,400,371 | 9/1968 | Amdahl et al. | 340—172.5 |
| 3,303,476 | 2/1967 | Moyer et al. | 340—172.5 |
| 3,588,831 | 6/1971 | Figueroa et al. | 340—172.5 |
| 3,559,187 | 1/1971 | Figueroa et al. | 340—172.5 |
| 3,541,513 | 11/1970 | Paterson | 340—172.5 |

GARETH D. SHAW, Primary Examiner

PO-1050
(5/69)

UNITED STATES PATENT OFFICE
CERTIFICATE OF CORRECTION

Patent No. 3,716,837 Dated February 13, 1973

Inventor(s) James M. Waddell

It is certified that error appears in the above-identified patent and that said Letters Patent are hereby corrected as shown below:

Column 7, line 3, change "Not" to --Note--.

Column 13, line 68, after "CC" delete "and".

Column 22, line 23, after "and" insert --responding means responsive to said interruption sig- --.

Signed and sealed this 3rd day of July 1973.

(SEAL)
Attest:

EDWARD M.FLETCHER,JR.
Attesting Officer

Rene Tegtmeyer
Acting Commissioner of Patents